United States Patent Office 3,380,885
Patented Apr. 30, 1968

3,380,885
TREATING CHRONIC RESPIRATORY DISEASE
WITH ANTIBIOTIC BOTTROMYCIN
Brinton M. Miller, Middletown, N.J., assignor to Merck
& Co., Inc., Rahway, N.J., a corporation of New Jersey
No Drawing. Filed Aug. 17, 1965, Ser. No. 480,501
12 Claims. (Cl. 167—53.1)

This invention relates to the treatment of chronic respiratory disease of chickens and infectious sinusitis of turkeys. More particularly, the present invention relates to the use of the antibiotic bottromycin and its salts in the treatment of chronic respiratory disease of chickens and infectious sinusitis of turkeys.

Chronic respiratory disease is a disease of chickens and turkeys, caused by a certain group of microorganisms known as PPLO or pleuropneumonia-like organisms which have been classified as Mycoplasma. This is referred to in the art as PPLO infection. In chickens the disease may be complicated by a secondary invader, at which time the disease is known as chronic respiratory disease complex. In turkeys this disease appears in two forms. It is called infectious sinusitis when it is in the form that affects the upper respiratory tract, and air sac disease when it affects the lower respiratory areas. For the purpose of simplicity, these diseases will be referred to herein as infectious sinusitis.

In chickens the chronic respiratory disease symptoms may be like those of any other respiratory disease such as Newcastle disease, infectious bronchitis, laryngotracheitis, fungus infection, etc. The usually observed symptoms are nasal discharge and a slight swelling below the eye. Coughing, sneezing, and a hoarse throat rattle or rale may accompany these signs. The symptoms of the disease in turkeys is often demonstrated by swollen sinuses with gelatinous exudate, watery eyes and coughing.

The economic loss that accompanies chronic respiratory disease is a drop in egg production by at least 10% to 40%, which affects the birds for several weeks or months. Poor hatchability of fertile eggs laid by infected hens can cause additional losses. Mycoplasma (PPLO) caused infection results in the death of a high percentage of embryos. Loss of weight in a large percentage of birds is also evident. There is, in addition, a significant amount of mortality in birds beginning at about four weeks of age.

Infection of birds may occur in a number of ways. Birds may be infected by contact with other infected birds, usually by an inhalation of nasal exudate from a sneezing bird. In fact, infected chickens or turkeys may become sick, and they may become carriers in which they appear to be healthy but are, in fact, infected with pathogenic strains of Mycoplasma (PPLO). In addition, birds may be infected through contaminated litter, manure, water and feed, breeding hens or contaminated hatcheries. Transmission of the disease via an infected embryonated egg contributes largely to an infected flock.

Chemotherapeutic control of these diseases has been successful with a very limited number of compounds. With one exception, the agents which have been found satisfactory are known antibiotics used clinically for other diseases, principally human diseases. The exception is the antibiotic tylosin. Although tylosin is used very broadly, strains of PPLO resistant to it have been encountered and the antibiotic has been shown to be toxic in use with turkeys.

Other antibiotics useful for controlling chronic respiratory disease in chickens and infectious sinusitis in turkeys are erythromycin and chlortetracycline or oxytetracycline. However, the dosage levels of these antibiotics required to obtain good results are quite high, which results in an economic barrier to the user. Other antibiotics known to have anti-PPLO activity usually require a dosage level too close to the toxic level to be of practical value. Included in this group are neomycin, kanamycin, and chloramphenicol.

Many other antibacterial antibiotics which are used for other infections have been found to be without effect on the PPLO. Examples of these would include penicillin and its many derivatives, cycloserine, novobiocin, and many others. As can be seen, this group includes agents with a wide spectrum of activity, hence their inactivity against Mycoplasma shows how these microbes are a unique and specialized type of bacterium.

The object of the present invention is to provide a new effective method of antibiotic inhibition of chronic respiratory disease of chickens and infectious sinusitis of turkeys.

Another object of the present invention is to provide an effective method of antibiotic inhibition of chronic respiratory disease of chickens and infectious sinusitis of turkeys wherein the antibiotic utilized has an acceptable oral absorption.

A further object of the present invention is to provide an effective method of antibiotic inhibition of chronic respiratory disease of chickens and infectious sinusitis of turkeys wherein the dosages of the antibiotic applied are relatively low.

An additional object of the present invention is to provide an effective method of antibiotic inhibition of chronic respiratory disease of chickens and infectious sinusitis of turkeys wherein the antibiotic is active against a wide range of strains of mycoplasmas, including those belonging to the species *M. gallisepticum*.

A still further object of the present invention is to provide an effective method of antibiotic inhibition of chronic respiratory disease of chickens and infectious sinusitis of turkeys wherein the antibiotic that is utilized demonstrates extremely low toxicity in turkeys and chickens.

Still an additional object of the present invention is to provide an effective method of treating chronic respiratory disease of chickens and infectious sinusitis of turkeys whereby the treated poultry infected with pathogenic strains of Mycoplasma develop a level of antibodies after curing which would hinder a second infection.

Yet another object of the present invention is to provide an effective method of treating embryonated (hatching) eggs which are infected by Mycoplasma.

Other additional objects of the present invention will become apparent to those skilled in the art by reading the following specification.

It has now been discovered that chronic respiratory disease of chickens and infectious sinusitis of turkeys may be effectively treated by the antibiotic bottromycin and its salts. Bottromycin is also known as B-mycin. It is a sulfur-containing antibiotic produced by a new, previously undescribed actinomycede, *Streptomyces canadensis*, and also *Streptomyces bottopensis*. A description of bottromycin may be found in the Journal of the American Chemical Society, vol. 79, page 4520, dated 1957, by Waisvisz et al. and in British Patent No. 762,736 published Dec. 5, 1956.

In treating chronic respiratory disease of chickens and infectious sinusitis of turkeys, bottromycin and its salts are active against a wide range of sero-types of *Mycoplasma gallisepticum* (PPLO). It has extremely low toxicity for chickens and shows only low toxicity in use with turkeys. Its oral absorption is good and the dosages that are required for bottromycin to be active against *Mycoplasma gallisepticum* (PPLO) are low. Furthermore, it has been found that bottromycin and its salts are effective in controlling chronic respiratory disease of chickens and infectious sinusitis of turkeys when administered in dosages ranging from about 0.1 mg./kg. to about 250 mg./kg. of bird body weight without the resulting danger of toxicity and preferably from 0.5 mg./kg. to 150 mg./kg. of body weight of the bird. Thus, bottromycin and its salts have demonstrated all of the indicated objects of the present invention.

As stated above, bottromycin has a known spectrum of activity against various strains of Mycoplasma. The results of in vitro assays (agar diffusion method) are illustrated in the following table. This test is similar to that described for penicillin in Analytical Microbiology, 1963, published by Academic Press, Inc., p. 327, except that the test organisms were strains of Mycoplasma and the agar medium was prepared with the following ingredients:

Bacto-PPLO [1] agar, dehydrated _____grams__ 34
Type A Yeast Hydrolysate [2] _____do____ 5
Horse serum _____ml__ 100
Distilled water _____ml__ 900

[1] Difco Laboratories, Detroit 1, Mich.
[2] Standard Brands, New York, N.Y.

TABLE A.—IN VITRO ACTIVITY OF BOTTROMYCIN

| Type or Strain and Serotype | Source | Zone of Inhibition, mm. | | |
|---|---|---|---|---|
| | | 500γ g./ml. | 250γ g./ml. | 125γ g./ml. |
| Human Campo | L. Dienes, Mass. General Hosp. | _____ | 26 | 24 |
| Chicken-Serotype J | P. Smith, Univ. of Penn. | 28 | 25 | 22 |
| Turkey-Serotype F | B.S. Pomeroy, Univ. of Minn. | 27 | 20.5 | 18 |
| Turkey-Serotype A (S-6) | H. Adler, Univ. of California. | 24 | 22 | 20 |

Embryonated (hatching) eggs which are infected with a virulent strain of Mycoplasma will either die before hatching or develop into chickens or turkeys which are infected. These same chickens or turkeys may then act as carriers and spreaders of Mycoplasma or they may develop the chronic respiratory disease state or the infectious sinusitis state and be lost because of mortality or poor weight gain.

Consequently, one means used to control the spread of chronic respiratory disease and infectious sinusitis, which is a primary means of transmission, is to treat the embryonated egg taken from a hen known to harbor the PPLO or a hen suspected of harboring the PPLO. Bottromycin was found to be effective in inhibiting the growth of *Mycoplasma gallisepticum* in infected embryonated chicken eggs.

The incubated egg is immersed in a cold water solution of the antibiotic or its salt for a period of 15 to 30 minutes. After immersion, the egg is removed to the incubator where development is allowed to continue. When the antibiotic concentrations in the dipping solution are arranged properly, the mycoplasma harbored within the egg will be exposed to a concentration of antibiotic as to effectively inhibit their further growth and thereby cure the egg. The effective dosage range of the antibiotic in water solution is from about 10 p.p.m. to about 500 p.p.m. and preferably from about 25 p.p.m. to about 150 p.p.m. Table B below illustrates this kind of treatment.

TABLE B.—TREATMENT OF EMBRYONATED CHICKEN EGGS INFECTED WITH MYCOPLASMA GALLISEPTICUM BY THE USE OF BOTTROMYCIN AND THE HYDROCHLORIDE SALT OF BOTTROMYCIN

| Infected | Treatment | Number of Eggs In Test | Mean Survival Eggs Time, days | Number of Surviving Eggs | Percent Survival |
|---|---|---|---|---|---|
| No | None | 10 | 33 | 10 | 100 |
| Yes | do | 10 | 3.2 | 0 | 0 |
| Yes | Bottromycin, 100 p.p.m | 10 | 8.3 | 3 | 30 |
| Yes | Bottromycin, 25 p.p.m | 10 | 5.2 | 1 | 10 |
| Yes | None | 20 | 4.2 | 0 | 0 |
| Yes | Bottromycin-HCl, 200 p.p.m | 20 | 6.8 | 3 | 15 |

In order to further illustrate the activity and the advantages of the method of the present invention utilizing bottromycin and its salts as antibiotic agents against chronic respiratory disease of chickens and infectious sinusitis of turkeys the following examples are given. It is understood, however, that they are given merely for the purpose of illustration and in no way are they to be taken as limiting.

Example 1.—Activity of bottromycin (free base) against *Mycoplasma gallisepticum* (PPLO) infection in chickens (subcutaneous administration)

Four groups numbering eleven or twelve, male and female white Leghorn chickens were employed in this test. Bottromycin was administered as an aqueous suspension in 5% gum acacia by the subcutaneous route. Doses of 5 and 25 mg./kg. of bird body weight were given daily for four consecutive days starting two days before infection. The birds were infected by injecting a broth concentrate of *Mycoplasma gallisepticum* (PPLO) via the intra air-sac route. The test was terminated four weeks after infection, and the results were evaluated on the basis of mortality and body weight gain.

TABLE I

| Treatment | Avg. Body Wt., gm. | | Avg. Gain, gm. | Percent of Non-Infected Body Wt. Gain | Mortality Dead/Total |
|---|---|---|---|---|---|
| | Initial | Final | | | |
| Non-Infected Controls | 82 | 458 | 376 | _____ | 0/12 |
| Infected Controls | 83 | 381 | 298 | 79 | 3/11 |
| Bottromycin, 2.5 mg./kg | 83 | 425 | 342 | 90 | 0/11 |
| Bottromycin, 0.5 mg./kg | 82 | 408 | 326 | 86 | 0/12 |

In the above test the body weight gain in the birds treated by the method of the present invention showed a significant increase over those of the infected controls. In addition, where 3 out of 11 or 27% of the infected controls died, all of the birds treated by the method of the present invention lived, as did the noninfected birds.

Example 2.—Activity of bottromycin against *Mycoplasma gallisepticum* (Turkey Strain) (PPLO) infection in chickens (subcutaneous administration)

Four groups of 12-day old white Leghorn pullets were employed in this test. Bottromycin was prepared as a suspension in water and administered by the subcutaneous route. Doses of 25 and 50 mg./kg. of bird body weight were injected immediately after infection and twice on the following day. The birds were infected with a strain of *Mycoplasma gallisepticum* which was isolated by H. Adler, University of California, from the brain of an infected turkey, and the results evaluated by the same method as Example 1 above.

cant increase over those of the infected controls. In addition, where 8 out of 12 or 67% of the infected controls died, only 5 out of 18 or 23% of the birds treated with the pamoate salt of bottromycin died. It should also be noted that while the antibiotic of the present invention showed significant activity at all levels, the higher levels administered were 100% effective.

TABLE II

| Treatment | Number of Birds | Avg. Body Wt., gm. | | Avg. Gain, gm. | Percent of Non-Infected Body Wt. Gain | Mortality Dead/Total |
|---|---|---|---|---|---|---|
| | | Initial | Final | | | |
| Non-Infected Controls | 12 | 68 | 362 | 294 | | 0/12 |
| Infected Controls | 12 | 68 | 307 | 239 | 85 | 1/12 |
| Bottromycin, 25.0 mg./kg | 12 | 68 | 331 | 263 | 91 | 1/12 |
| Bottromycin, 50.0 mg./kg | 11 | 68 | 369 | 301 | 102 | 0/11 |

In the above test the body weight gain in the birds treated by the method of the present invention showed a significant increase over those of the infected controls. In addition, where 1 out of 12 or 8% of the infected controls died, only 1 out of 23 or 4% of the birds treated by the method of the present invention died.

Example 3.—Activity of bottromycin salts (tartrate) against *Mycoplasma gallisepticum* (PPLO) infection in chickens (subcutaneous administration)

Groups of 6-day old white Leghorn chickens were employed in this test. Bottromycin tartrate was administered in an aqueous suspension by the subcutaneous route. Doses of 2.0–100 mg./kg. of bird body weight were administered 18 and 25 hours after infection. The birds were infected and the results evaluated by the same method as in Example 1 above.

TABLE III

| Treatment | Dose, mg./kg. (1, 18, 25 hrs.) S.C. | Mortality | Avg. Wt. Gain, gm. | Percent Wt. Gain |
|---|---|---|---|---|
| Non-Infected Controls | | 0/12 | 215 | |
| Infected Controls | | 9/12 | 138 | 64 |
| Bottromycin (Tartrate) | 3×2.0 | 1/6 | 158 | 74 |
| | 3×10 | 0/6 | 216 | 100 |
| | 3×25 | 0/6 | 191 | 89 |
| | 3×50 | 0/6 | 215 | 100 |
| | 3×100 | 1/6 | 206 | 96 |

In the above test the body weight gain in the birds treated by the method of the present invention showed a significant increase over those of the infected controls. In addition, where 9 out of 12 or 75% of the infected controls died, only 2 out of 30 or 6% of the birds treated by the method of the present invention died.

Example 4.—Activity of bottromycin salts (pamoate) against *Mycoplasma gallisepticum* (PPLO) infection in chickens (subcutaneous administration)

Groups of 6 chickens and one group of 12 (infected controls) were employed in this test. Bottromycin pamoate in an aqueous suspension was administered via the subcutaneous route. The chickens were infected as in Example 1 and treated as indicated 1, 18, and 25 hours after infection. The test was terminated three weeks after infection and evaluated as in Example 1 above.

TABLE IV

| Treatment | Dose, mg./kg. | Mortality | Avg. Wt. Gain, gm. | Percent Wt. Gain |
|---|---|---|---|---|
| Non-Infected Controls | | 0/6 | 211 | |
| Infected Controls | | 8/12 | 109 | 51.5 |
| Bottromycin (Pamoate, s.c.) | 3×0.4 | 2/6 | 132 | 63 |
| | 3×2.0 | 3/6 | 177 | 84 |
| | 3×10.0 | 0/6 | 189 | 90 |

In the above the body weight gain in the birds treated by the method of the present invention showed a signifi- Example 5.—Activity of bottromycin (tartrate) against *Mycoplasma gallisepticum* (PPLO) infection in chickens (oral administration)

Groups of 6 chickens and 1 group of 18 used as controls were employed in this test. Bottromycin tartrate in an aqueous suspension was administered orally in the doses indicated in the following table one hour after infection, some chickens were treated a second time 5 days later, and some chickens were treated three times 1, 18, and 25 hours after infection. The birds were infected as indicated in Example 1 above. The test was terminated 3 weeks after infection, and the results evaluated on the same basis as in Example 1 above.

TABLE V

| Treatment | Dose, mg./kg. | Mortality | Avg. Wt. Gain, gm. | Percent Wt. Gain |
|---|---|---|---|---|
| Non-Infected Controls | | 0/6 | 202 | |
| Infected Controls | | 15/18 | 119 | 59 |
| Bottromycin Tartrate (Oral) | 1×5 | 3/6 | 135 | 67 |
| | 1×10 | 1/6 | 157 | 78 |
| | 1×20 | 0/6 | 174 | 86 |
| | 1×40 | 0/6 | 190 | 94 |
| Do | 2×5 | 1/5 | 144 | 71 |
| | 2×10 | 1/5 | 141 | 70 |
| | 2×20 | 0/4 | 144 | 71 |
| Do | 3×100 | 0/6 | 196 | 93 |
| | 3×200 | 0/6 | 191 | 91 |

In the above test the body weight gain in the birds treated by the method of the present invention showed a significant increase over those of the infected controls. In addition, where 15 out of 18 or 83% of the infected controls died, only 6 out of 50 or 12% of the the birds treated by the method of the present invention died. It should also be noted that while the antibiotic of the present invention showed significant activity at all levels, the higher levels administered were 100% effective.

Example 6.—Activity of bottromycin (tartrate) against *Mycoplasma gallisepticum* (PPLO) infection in chickens (oral administration)

Groups of 6 chickens were employed in this test. Bottromycin was administered orally one hour, 24 hours and 4 days after infection in the doses indicated in the following table. The birds were infected as indicated in Example 1 above. The test was terminated 3 weeks after infection and the results evaluated on the same basis as in Example 1.

TABLE VI

| Treatment | Dose, mg./kg. | Mortality | Avg. Wt. Gain, gm. | Percent Wt. Gain |
|---|---|---|---|---|
| Non-Infected Controls | | 0/6 | 223 | |
| Infected Controls | | 5/6 | 151 | 67.5 |
| Bottromycin 1 hr. post infection | 1×40 | 0/6 | 177.5 | 79.5 |
| | 1×160 | 0/5 | 213 | 95.5 |
| Bottromycin 24 hrs. post infection | 1×10 | 3/6 | 156 | 70 |
| | 1×40 | 2/6 | 190.7 | 85.5 |
| | 1×160 | 1/6 | 205 | 92 |
| Bottromycin 4 days post infection | 1×40 | 1/5 | 175 | 79.5 |
| | 1×160 | 0/5 | 194.4 | 87 |

In the above test the body weight gain in the birds treated by the method of the present invention showed a significant increase over those of the infected controls. In addition, where 5 out of 6 or 83% of the infected controls died, only 7 out of 28 or 25% of the birds treated by the method of the present invention died.

Example 7.—Antibiotic absorption of bottromycin following subcutaneous administration to chickens Two samples of bottromycin were employed in doses ranging from 25 to 100 mg./kg. of bird body weight. The samples were prepared as an aqueous suspension and administered subcutaneously to groups of poult chickens. The birds were bled by heart puncture one half and one and one half hours after dosing and plasma prepared for in vitro assays against *Mycoplasma gallisepticum* (PPLO). The paper disk agar plate assay procedure was employed. Undiluted plasma and samples diluted 1 to 5, 1 to 25, 1 to 125, 1 to 625 and 1 to 3125 were tested. The results of the assay against *Mycoplasma gallisepticum* (PPLO) are presented in the following table. Anti-PPLO activity was detected in the plasma in the birds treated with these samples of bottromycin.

TABLE VII

| Treatment | Dose, mg./kg. | Maximum amount of Dilution showing Anti-PPLO Activity | |
|---|---|---|---|
| | | ½ hr. | 1½ hr. |
| Bottromycin Sample A | 50 | 1/125 | |
| | 100 | 1/125 | 1/25 |
| Bottromycin Sample B | 25 | 1/25 | 1/5 |
| | 50 | 1/25 | 1/25 |

While specific embodiments of the present invention have been named and described, it will be apparent to those skilled in the art that changes may be made in the detail shown without departing from the spirit of the present invention or the scope intended. Any departure from the above description which conforms to the present invention is intended to be included within the scope of the claims.

I claim:
1. A method of treating poultry infected with pleuropneumonia-like organisms comprising administering to said infected poultry effective doses of an antibiotic selected from the group consisting of bottromycin and its salts.
2. The method of claim 1 wherein said effective dosage is in the range of from about 0.1 mg./kg. to about 250 mg./kg. of body weight of said infected poultry.
3. The method of claim 1 wherein said effective dosage is in the range of from about 0.5 mg./kg. to about 160 mg./kg. of body weight of said infected poultry.
4. The method of claim 3 wherein said effective dosage of said antibiotic is administered by subcutaneous route.
5. The method of claim 3 wherein said effective dosage of said antibiotic is administered by oral route.
6. The method of claim 3 wherein the antibiotic administered is bottromycin.
7. The method of claim 3 wherein the antibiotic administered is a salt of bottromycin.
8. A method of treating embryonated eggs infected with pleuropneumonia-like organisms comprising immersing said infected eggs in a cold water solution containing an effective amount of an antibiotic selected from the group consisting of bottromycin and its salts.
9. The method of claim 8 wherein said effective dosage is in the range of from about 10 p.p.m. to about 500 p.p.m of said water solution.
10. The method of claim 8 wherein said effective dosage is in the range of from about 25 p.p.m. to about 150 p.p.m. of said water solution.
11. The method of claim 10 wherein the antibiotic administered is bottromycin.
12. The method of claim 10 wherein the antibiotic administered is a salt of bottromycin.

References Cited

Waisvisz et al., J.A.C.S., vol. 79, Aug. 20, 1957, pp. 4520 to 4527.

SAM ROSEN, *Primary Examiner.*